United States Patent [19]
Phillips et al.

[11] Patent Number: 5,782,097
[45] Date of Patent: Jul. 21, 1998

[54] GENERATOR-ABSORBER-HEAT EXCHANGE HEAT TRANSFER APPARATUS AND METHOD AND USE THEREOF IN A HEAT PUMP

[75] Inventors: Benjamin A. Phillips, Benton Harbor; Thomas S. Zawacki, St. Joseph, both of Mich.

[73] Assignee: Phillips Engineering Co., St. Joseph, Mich.

[21] Appl. No.: 641,217

[22] Filed: Apr. 30, 1996

Related U.S. Application Data

[63] Continuation-in-part of Ser. No. 347,255, Nov. 23, 1994, Pat. No. 5,570,584.
[51] Int. Cl.[6] ................................................. F25B 15/00
[52] U.S. Cl. ............................. 62/101; 62/476; 62/483; 62/497
[58] Field of Search ........................... 62/101, 105, 112, 62/114, 141, 148, 238.3, 324.2, 476, 483, 485, 487, 495, 497

[56] References Cited

U.S. PATENT DOCUMENTS

| | | |
|---|---|---|
| 1,180,687 | 4/1916 | Altenkirch et al. . |
| 1,854,223 | 4/1932 | Randel . |
| 2,392,894 | 1/1946 | Zwickl . |
| 2,979,923 | 4/1961 | Bury . |
| 3,046,756 | 7/1962 | Whitlow et al. . |
| 3,055,194 | 9/1962 | Fink . |
| 3,236,064 | 2/1966 | Whitlow . |
| 3,254,507 | 6/1966 | Whitlow . |
| 3,323,323 | 6/1967 | Phillips . |
| 3,353,369 | 11/1967 | Whitlow . |
| 3,357,203 | 12/1967 | Briggs . |
| 3,357,688 | 12/1967 | Whitlow . |
| 3,367,137 | 2/1968 | Whitlow . |
| 3,367,310 | 2/1968 | Whitlow et al. . |
| 3,390,544 | 7/1968 | Eberz . |
| 3,394,926 | 7/1968 | Whitlow et al. . |
| 3,407,625 | 10/1968 | McDonald . |
| 3,410,104 | 11/1968 | Hopkins . |
| 3,423,951 | 1/1969 | Eisberg . |

(List continued on next page.)

FOREIGN PATENT DOCUMENTS

| | | |
|---|---|---|
| 272868 | 1/1928 | United Kingdom . |
| 2179137 | 2/1987 | United Kingdom . |

OTHER PUBLICATIONS

R.J. Modahl and F.C. Hayes, "Evaluation of Commerical Advanced Absorption Heat Pump Breadboard," The Trane Company, pp. 117–125, Aug. 1988.
"Development of a Residential Gas Fired Absorption Heat Pump," Chemical Sector Allied Corporation, pp. 2–1 to 2–9, Aug. 1985.
"Phillips Engineering Gas Space Conditioner," pp. 1–10, and summary page, Nov. 5, 1990.
International Journal of Refrigeration, vol. 9, No. 6, Nov. 1986, pp. 326–333, Scharfe et al., "Analysis of Advantages and Limitations of Absorber–Generator Heat Exchange."
B.A. Phillips; "Analyses of Advanced Residential Absorption Heat Pump Cycles"; Proceedings of DOE/ORNL Heat Pump Conference, Washington, D.C.; Dec. 11–13, 1984; pp. 265–287.

(List continued on next page.)

Primary Examiner—John M. Sollecito
Attorney, Agent, or Firm—Finnegan, Henderson, Farabow, Garrett & Dunner

[57] ABSTRACT

Numerous embodiments and related methods for generator-absorber heat exchange (GAX) are disclosed, particularly for absorption heat pump systems. Such embodiments and related methods use, as the heat transfer medium, the working fluid of the absorption system taken from the generator at a location where the working fluid has a rich liquor concentration.

49 Claims, 5 Drawing Sheets

U.S. PATENT DOCUMENTS

| | | |
|---|---|---|
| 3,466,893 | 9/1969 | Phillips et al. . |
| 3,481,150 | 12/1969 | English . |
| 3,483,710 | 12/1969 | Bearint . |
| 3,491,551 | 1/1970 | Frohbieter . |
| 3,491,552 | 1/1970 | Roeder, Jr. . |
| 3,509,732 | 5/1970 | Roeder, Jr. . |
| 3,517,522 | 6/1970 | Ozono et al. . |
| 3,527,060 | 9/1970 | Kruggel . |
| 3,527,061 | 9/1970 | Kruggel . |
| 3,566,615 | 3/1971 | Roeder, Jr. . |
| 3,584,975 | 6/1971 | Frohbieter . |
| 3,626,716 | 12/1971 | Leonard, Jr. . |
| 3,638,452 | 2/1972 | Kruggel . |
| 3,639,087 | 2/1972 | Frohbieter . |
| 3,641,784 | 2/1972 | Schlichtig . |
| 3,690,121 | 9/1972 | Patel . |
| 3,693,373 | 9/1972 | Gable . |
| 3,717,007 | 2/1973 | Kuhlenschmidt . |
| 3,750,416 | 8/1973 | Kuhlenschmidt . |
| 3,895,499 | 7/1975 | Hopkins . |
| 3,990,264 | 11/1976 | Patnode et al. . |
| 4,031,712 | 6/1977 | Costello . |
| 4,106,309 | 8/1978 | Phillips . |
| 4,127,009 | 11/1978 | Phillips . |
| 4,127,010 | 11/1978 | Phillips . |
| 4,127,993 | 12/1978 | Phillips . |
| 4,171,619 | 10/1979 | Clark . |
| 4,193,268 | 3/1980 | Phillips . |
| 4,207,751 | 6/1980 | Kampfenkel et al. . |
| 4,209,364 | 6/1980 | Rothschild . |
| 4,237,701 | 12/1980 | Holldorff . |
| 4,246,761 | 1/1981 | Phillips et al. . |
| 4,285,211 | 8/1981 | Clark . |
| 4,299,093 | 11/1981 | Cohen et al. . |
| 4,311,019 | 1/1982 | Rojey et al. . |
| 4,329,851 | 5/1982 | Bourne . |
| 4,337,625 | 7/1982 | Wilkinson . |
| 4,383,416 | 5/1983 | Phillips . |
| 4,410,134 | 10/1983 | Heimbach et al. . |
| 4,445,340 | 5/1984 | Reimann . |
| 4,454,724 | 6/1984 | Erickson . |
| 4,463,570 | 8/1984 | Kantner . |
| 4,467,623 | 8/1984 | Reimann . |
| 4,475,361 | 10/1984 | Alefeld . |
| 4,476,694 | 10/1984 | Kunugi . |
| 4,485,638 | 12/1984 | Reimann . |
| 4,505,133 | 3/1985 | Malewski et al. . |
| 4,526,009 | 7/1985 | van der Sluys et al. . |
| 4,531,374 | 7/1985 | Alefeld . |
| 4,534,180 | 8/1985 | Yasuda et al. . |
| 4,542,628 | 9/1985 | Sarkisian et al. . |
| 4,542,629 | 9/1985 | Biermann . |
| 4,545,217 | 10/1985 | Nakao et al. . |
| 4,546,620 | 10/1985 | Biermann . |
| 4,563,295 | 1/1986 | Erickson . |
| 4,567,736 | 2/1986 | van der Sluys et al. . |
| 4,580,407 | 4/1986 | Aime et al. . |
| 4,593,531 | 6/1986 | Fujimoto . |
| 4,596,122 | 6/1986 | Kantner . |
| 4,646,541 | 3/1987 | Reid, Jr. et al. . |
| 4,665,711 | 5/1987 | Page . |
| 4,691,525 | 9/1987 | Gelderloos . |
| 4,691,532 | 9/1987 | Reid et al. . |
| 4,706,464 | 11/1987 | Kreutmair . |
| 4,718,237 | 1/1988 | Sterlini . |
| 4,718,243 | 1/1988 | Buschulte et al. . |
| 4,719,767 | 1/1988 | Reid, Jr. et al. . |
| 4,722,193 | 2/1988 | Purvis et al. . |
| 4,724,679 | 2/1988 | Radermacher . |
| 4,732,008 | 3/1988 | DeVault . |
| 4,735,065 | 4/1988 | Vinz . |
| 4,742,687 | 5/1988 | Reid et al. . |
| 4,742,693 | 5/1988 | Reid, Jr. et al. . |
| 4,763,488 | 8/1988 | Johnston . |
| 4,770,005 | 9/1988 | Alefeld . |
| 4,827,728 | 5/1989 | DeVault et al. . |
| 4,846,240 | 7/1989 | Erickson . |
| 4,894,998 | 1/1990 | Kaneko et al. . |
| 4,921,515 | 5/1990 | Dao . |
| 4,926,659 | 5/1990 | Christensen et al. . |
| 4,938,028 | 7/1990 | Murray . |
| 4,966,007 | 10/1990 | Osborne . |
| 4,966,014 | 10/1990 | Erickson . |
| 4,967,566 | 11/1990 | Bergmann et al. . |
| 4,972,679 | 11/1990 | Petty et al. . |
| 5,016,444 | 5/1991 | Erickson . |
| 5,024,063 | 6/1991 | Erickson . |
| 5,033,274 | 7/1991 | Erickson . |
| 5,038,574 | 8/1991 | Osborne . |
| 5,050,392 | 9/1991 | Messmer et al. . |
| 5,050,403 | 9/1991 | Maier-Laxhuber . |
| 5,097,676 | 3/1992 | Erickson . |
| 5,218,843 | 6/1993 | Dao . |
| 5,271,235 | 12/1993 | Phillips et al. . |
| 5,367,884 | 11/1994 | Phillips et al. . |
| 5,456,086 | 10/1995 | Hanna .................................. 62/476 |
| 5,490,393 | 2/1996 | Fuesting et al. . |
| 5,570,584 | 11/1996 | Phillips et al. ........................ 62/476 |

OTHER PUBLICATIONS

B.A. Phillips; "High Efficiency Absorption Cycles for Residential Heating and Cooling"; Intersociety Energy Conversion Eng. Conference, Miami Beach, Florida; Aug. 18–23, 1985; pp. 2.229–2.234.

B.A. Phillips; "A New Future for Absorption?"; ASHRAE Journal; Nov. 1986; pp. 38–42.

B.A. Phillips; "Progress and Problems in Recent Research on Absorption Cycles and Fluids"; U.S. –Israel Workshop, Washington, D.C.; Apr. 23–24, 1987; pp. 89–93.

B.A. Phillips; "Development of an Advanced–Cycle Absorption Heat Pump for Residential Applications"; Proceedings of 2nd DOE/ORNL Heat Pump Conference, Washington, D.C., Apr. 17–20, 1988; pp. 111–116.

B.A. Phillips; "Development of an Advanced–Cycle Absorption Heat Pump for Residential Applications"; Proceedings of the 2nd DOE/ORNL Heat Pump Conference, Washington, D.C., Apr. 17–20, 1988, pp. 111–116; Document prepared by ORNL for DOE, Aug. 1988.

B.A. Phillips; "High Efficiency Absorption Cycles for Residential Heating and Cooling"; pp. 1–6.

B.A. Phillips; "Development of a Gas Fired Heat Pump with an Improved Absorption Cycle"; ASME Winter Annual Meeting, Nov. 27 –Dec. 2, 1988; Chicago, Illinois.

Columbia Double–Effect Absorption Gas Heat Pump, Market and Technology Prospectus; Columbia Gas System Services Corp., Columbus, Ohio, Feb., 1990.

B.A. Phillips; "Development of a High Efficiency, Gas–Fired, Absorption Heat Pump for Residential and Small–Commercial Applications –Phase I Final Report Analysis of Advanced Cycles and Selection of the Preferred Cycle"; Oak Ridge National Laboratory, Sep., 1990.

Dr. Benjamin A. Phillips; "Absorption Cycles for Air–Cooled Solar Air Conditioning", St. Joseph, Michigan, 1976.

GENERATOR-ABSORBER-HEAT EXCHANGE HEAT TRANSFER APPARATUS AND METHOD AND USE THEREOF IN A HEAT PUMP

RELATED APPLICATIONS

The present application is a continuation-in-part of application Ser. No. 08/347,255, filed on Nov. 23, 1994 now U.S. Pat. No. 5,570,584, the disclosure of which is incorporated by reference herein.

GOVERNMENT RIGHTS

This invention was made with Government support under contract 86X-17497C awarded by the Department of Energy. The Government has certain rights in this invention.

BACKGROUND OF THE INVENTION

1. Field of the Invention

The present invention relates to refrigeration and heat pump systems and more particularly to an absorption refrigeration cycle of the generator-absorber heat exchange ("GAX") type. The invention is especially adapted for use in a gas-fired, air-to-air, absorption heat pump.

2. Description of Related Art

Absorption refrigeration cycles were developed in the mid 1800's and were used primarily in refrigeration systems. Such cycles operated by using a refrigerant/absorbent mixture, the refrigerant vapor being absorbed in an absorber into a liquid absorbent, thus producing heat, followed by heating the refrigerant/absorbent mixture in a generator to drive off the refrigerant vapor. A condenser, which also produced heat, and an evaporator, which extracted heat, completed the cycle. The heat produced by absorption in the absorber was discarded, along with that from the condenser, to a coolant, generally cooling water.

These early "single stage" absorption cycle systems were energy inefficient but were often preferred to compression systems, before the advent of electric motors, because the cost of heat energy to operate them was low and they required much less mechanical energy than compression systems. For most applications, the use of these single stage absorption systems declined with changes in the relative cost of gas and electric energy and improvements in electrically operated compression systems. However, even today, these relatively inefficient single stage systems are still in use in low pressure lithium bromide commercial air conditioning systems and in refrigeration systems for recreational vehicles and hotel rooms.

In 1913, an improved absorption cycle was devised by Altenkirch. This cycle was made more efficient than the early single stage cycles by transferring a portion of the heat produced in the absorber to the refrigerant/absorbent fluid circulated to the generator, and transferring to the generator a portion of the heat in the absorbent flowing from the generator to the absorber. This transfer of heat reduced the heat input required to the generator to evaporate the refrigerant from the refrigerant/absorbent mixture. This system has been called the absorber heat exchange (AHE) system.

The AHE cycle was used in the early 1960's to produce absorption systems that were efficient enough to be cost effective air conditioners at that time. The AHE cycle has been used in residential, air cooled air conditioners, starting in 1965. However, even in these AHE systems, a large portion of the heat generated by the absorption process in the absorber was lost. The AHE cycle was also used experimentally in air-to-air gas heat pumps, which were also advantageous in heating, but were never commercially produced. As energy costs have increased, the AHE air conditioners have lost much of their operating cost advantages and today, have only a limited market.

Also in 1913, Altenkirch devised another absorption cycle that recovered more of the heat of absorption from the absorber. This cycle, which has come to be known as the generator-absorber heat exchange (GAX) cycle, utilized an additional heat exchange system, whereby high temperature heat produced by the absorption process in the absorber was transferred via a heat exchange fluid to the generator. This GAX cycle concept is capable of recovering an additional large amount of heat from the absorber and capable of utilizing higher generator temperatures than the AHE system and thus is capable of achieving much higher energy efficiencies. The heating efficiency of such GAX systems, relative to the particular fuel used, can be much higher than that of furnaces, boilers, etc.

However, prior art GAX cycle systems suffered from the disadvantage that a separate heat transfer circuit using a separate heat transfer fluid was required. This heat transfer circuit had to be hermetic, required an expansion chamber, required a hermetic pump capable of variable flow, and required a system to control the amount of flow of the heat transfer fluid to match the GAX heat to be transferred in either the cooling or heating cycle at the particular outdoor temperature. Also, using a fluid in the heat transfer circuit different from the working fluid created the danger of cross-contamination between the heat transfer circuit and the absorber or generator. These prior art GAX systems typically used a heat transfer fluid that remained in the liquid phase and thus could only use the sensible heat of the heat transfer liquid.

Electric heat pumps, which operate with a standard condenser-evaporator cycle, have heretofore been utilized for residential and small commercial heating and cooling applications. However, while electric heat pumps can effectively satisfy the heating and cooling requirements of residential and small commercial buildings in areas having relatively warm climates, such as the southern states of the United States, these electric heat pumps are not capable of providing, without auxiliary heating equipment, the necessary heating in climates where the temperatures drop below about 30° F. In addition, these electric heat pump systems typically use refrigerants that may be hydrochlorofluorocarbons (HCFC's) or chlorofluorocarbons (CFC's), which are environmentally hazardous.

Thus, the need exists for a generator-absorber heat exchange apparatus and method suitable for use in a residential or small commercial heat pump that efficiently transfers a large portion of the heat produced by the absorption process in the absorber to the generator without the use of a costly, possibly failure prone, independent heat transfer circuit.

The instant invention satisfies that need by providing a generator-absorber heat exchange apparatus and method that can use an environmentally safe fluid as both the working fluid and the heat exchange fluid, that efficiently recovers a large proportion of the heat generated by the absorption process in the absorber, that does not require an elaborate system of controls, that advantageously may use either or both the latent heat and the sensible heat of the working fluid to transfer heat from the absorber to the generator by operating between its vapor and liquid phases, and that, because of size, cost and efficiency, can be used to satisfy residential and commercial heating and cooling requirements over a wide range of climates, including sufficient heating at temperatures below 0° F.

Additional features and advantages of the invention will be set forth in the drawings and written description which follow, and in part will be apparent from the drawings and written description or may be learned from the practice of the invention. The advantages of the invention will be realized and attained by the generator-absorber heat exchange apparatus, the heat pump incorporating the generator-absorber heat exchange apparatus and the method for transferring heat between an absorber and generator in a generator-absorber heat exchange apparatus, particularly pointed out in the drawings, written description and claims hereof.

SUMMARY OF THE INVENTION

To achieve these and other advantages, and in accordance with the purpose of the invention as embodied and broadly described herein, the present invention, in one aspect, provides a generator-absorber heat exchange apparatus that includes a generator and an absorber. The absorber has an interior pressure lower than the interior pressure of the generator and each has high and low temperature regions at opposite ends establishing respective temperature ranges. The temperature ranges of the generator and absorber define respective overlapping heat transfer regions. A fluid flow pathway is provided for circulating a liquor having rich, intermediate and weak concentrations of refrigerant to and through the high temperature, heat transfer and low temperature regions of the generator and the absorber. A heat exchange circuit is provided, which circuit receives a liquor from the generator at a location where the liquor has a rich liquor concentration. The heat exchange circuit also circulates the liquor between the heat transfer regions of the absorber and the generator to transfer heat from the absorber to the generator.

In a preferred embodiment, the heat exchange circuit further comprises a heat exchange element disposed in the heat transfer region of the absorber and a conduit conducting the rich liquor from the generator through the heat exchange element and between heat transfer regions.

In a further preferred embodiment, the heat exchange circuit comprises a heat exchange element disposed in the heat transfer region of each of the generator and absorber, and a conduit conducting the rich liquor from the generator serially to each heat exchange element sequentially between heat transfer regions.

In accordance with another aspect of the invention, the heat exchange circuit preferably includes an input end in fluid communication with the generator at a location where the liquor has a rich liquor concentration. The heat exchange circuit may also include an output end for distributing the rich liquor circulated between heat transfer regions within the generator. The liquor circulated between heat transfer regions of the generator and absorber is preferably a two phase mixture of liquid and vapor in at least a portion of the heat exchange circuit.

The present invention, in another aspect, comprises a generator-absorber heat exchange apparatus that includes a generator containing a liquor having a concentration gradient that is rich proximate an upper end, weak proximate a lower end and intermediate therebetween, and a temperature gradient extending from low proximate the upper end to high proximate the lower end with a heat transfer region therebetween. The generator-absorber heat exchange (GAX) apparatus in this aspect of the invention also includes an absorber having a pressure in its interior lower than the interior pressure of the generator and containing a liquor having a concentration gradient that is weak proximate an upper end, rich proximate a lower end and intermediate therebetween, and a temperature gradient extending from high proximate the upper end to low proximate the lower end with a heat transfer region therebetween. The GAX apparatus in this aspect also includes a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator. A pump in fluid communication with the rich liquor conduit is also provided for moving fluid through the conduit between the absorber and the generator. A weak liquor conduit is provided having an inlet in fluid communication with the generator proximate the lower end thereof and an outlet disposed in the absorber proximate the upper end thereof distributing weak liquor from the lower end of the generator for passage along the concentration and temperature gradients of the generator. A heater is disposed to heat liquor in the generator proximate the lower end thereof. The GAX apparatus in this aspect of the invention also includes a heat exchange circuit comprising:

a heat exchange element in the heat transfer region of the absorber, the heat transfer regions of the generator and absorber having overlapping temperatures; and a heat exchange conduit having an input end receiving liquor from the generator at a location where the liquor has a rich liquor concentration and conveying the liquor between the heat transfer regions of the absorber and the generator for heat transfer therebetween. The heat exchange conduit may also have an output end distributing the rich liquor in the generator.

The present invention also provides, in another aspect, a heat pump comprising an indoor liquid to air heat exchanger, an outdoor liquid to air heat exchanger, the generator-absorber heat exchange apparatus and an antifreeze circuit. The antifreeze circuit in accordance with this aspect of the invention circulates antifreeze fluid between the indoor and outdoor heat exchangers and the generator-absorber heat exchange apparatus for selectively extracting heat from one of the heat exchangers and transferring heat to the other of the heat exchangers.

In accordance with another aspect of the present invention, a method is provided for transferring heat between an absorber and a generator in a generator-absorber heat exchange apparatus. This heat transfer is accomplished by circulating a rich liquor between a heat transfer region of the absorber and a heat transfer region of the generator. As mentioned above, the heat transfer region of the generator and the heat transfer region of the absorber have temperature gradients including a common temperature range.

In accordance with another aspect of the invention, a method is provided for transferring heat between a region of low temperature and a region of medium temperature using the generator-absorber heat exchange apparatus of the invention. This method comprises circulating an antifreeze fluid between an indoor heat exchanger and at least one of an absorber heat exchanger, a condenser heat exchanger and a generator heat exchanger, thereby transferring heat via the antifreeze fluid from the at least one absorber, condenser and generator heat exchanger to the indoor heat exchanger. The method also comprises circulating an antifreeze fluid between an outdoor heat exchanger and an evaporator heat exchanger, thereby transferring heat via the antifreeze fluid from the outdoor heat exchanger to the evaporator heat exchanger.

In accordance with another aspect of the invention, a method is provided for transferring heat between a region of high temperature and a region of medium temperature using the generator-absorber heat exchange apparatus of the invention. This method comprises circulating an antifreeze fluid between an outdoor heat exchanger and at least one of an absorber heat exchanger, a condenser heat exchanger and a generator heat exchanger, thereby transferring heat via the antifreeze fluid from the at least one absorber, condenser and generator heat exchanger to the outdoor heat exchanger. The method also comprises circulating an antifreeze fluid between an indoor heat exchanger and an evaporator heat exchanger, thereby transferring heat via the antifreeze fluid from the indoor heat exchanger to the evaporator heat exchanger.

Although the invention is illustrated as embodied in a gas-fired residential heat pump, the invention as broadly claimed is not so limited and its benefits and advantages apply equally to other heating and refrigeration processes. The above and other advantages and features of this invention will become apparent upon review of the following specification in conjunction with the drawings.

DETAILED DESCRIPTION OF THE PREFERRED EMBODIMENTS

In accordance with the invention, the term "weak liquor" as used herein refers to the liquor in the high temperature region of the generator or absorber, i.e., the bottom portion of the generator or the top portion of the absorber. The term "rich liquor" as used herein refers to the liquor in the low temperature region of the generator or absorber, i.e., the bottom portion of the absorber or the top portion of the generator. As used herein, the term "intermediate liquor" refers to a liquor that has a concentration of refrigerant that is less than the rich liquor concentration but greater than the weak liquor concentration. The various intermediate liquors are present in the absorber and/or the generator. The terms "weak," "intermediate" and "rich" refer to the relative concentration of the absorbed component(s), i.e., refrigerant, to the concentration of the absorbent component(s), i.e., water. Thus, a weak liquor liquid has less absorbed refrigerant, such as ammonia, and more absorbent, such as water, than an equal amount of a rich liquor liquid.

As noted above, both the absorbed component(s) and the absorbent component(s) constituting the weak liquor, intermediate liquor and rich liquor may be in either a vapor or liquid state or a combination of the two. Also, the term "heat pump" as used herein is intended to include any apparatus that transforms heat between low, medium and high temperature states and is intended to include not only the commonly understood meaning of the term, but also as used herein is intended to include heat transformers as well as more traditional systems such as refrigeration, air conditioning, and related processes.

Figure 1:
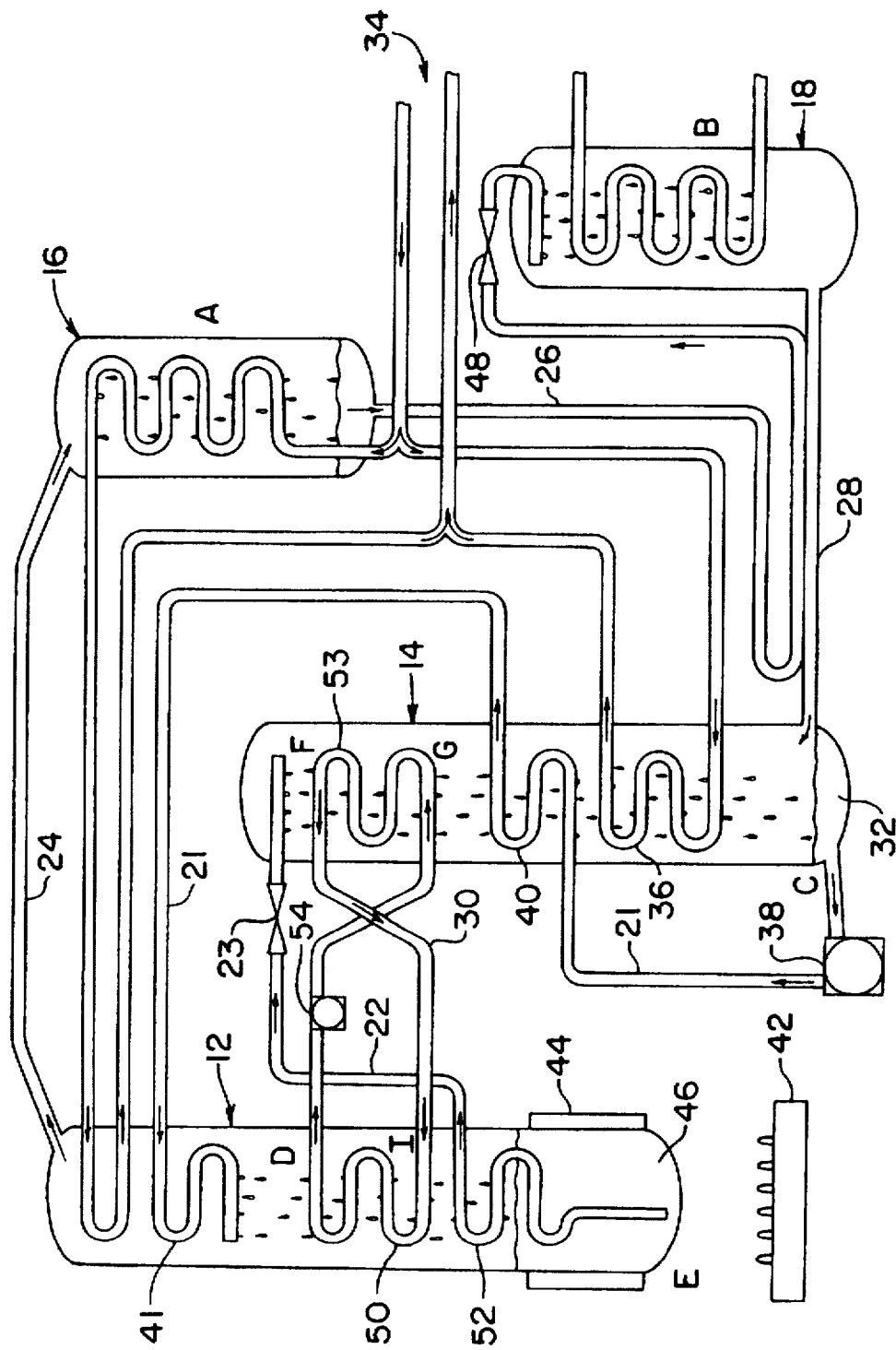
FIG. 1 is a flow diagram illustrating an absorption apparatus using a conventional generator-absorber, heat-exchange (GAX) circuit.

In the known prior art system illustrated in FIG. 1, a generator-absorber heat exchange apparatus 10 operating on the generator-absorber heat exchange (GAX) cycle generally comprises a generator 12, an absorber 14, a condenser 16, an evaporator 18, a solution pump 38, and working fluid pathways for circulation of a refrigerant/absorbent liquor to and through generator 12 and absorber 14 and circulation of a refrigerant liquor through condenser 16 and evaporator 18. In particular, the refrigerant/absorbent liquor pathway includes a rich liquor pathway 21 providing fluid communication of rich liquor 32 from a low temperature region C of absorber 14 to a low temperature region D of generator 12, and a weak liquor pathway 22 providing fluid communication of weak liquor 46 from a high temperature region E of generator 12 to a high temperature region F of absorber 14. The refrigerant/absorbent liquor pathway is completed by passage of liquor from weak liquor pathway 22 through high temperature, intermediate temperature and low temperature regions F, G, C of absorber 14 and by passage of liquor from rich liquor pathway 21 through low temperature, intermediate temperature and high temperature regions D, I, E of generator 12. The working fluid pathway is completed from generator 12 to condenser 16 through conduit 24, from condenser 16 to evaporator 18 through conduit 26, and from evaporator 18 to absorber 14 through conduit 28.

The terms "low temperature region," "intermediate temperature region" and "high temperature region" as used herein are meant to refer to relative temperatures. As depicted in FIG. 1, each region will be defined by a range of temperatures which in each particular component is relatively higher or lower than the other region. Thus, for example, high temperature region E of generator 12 might have a temperature of around 400° F. and low temperature region D of generator 12 might have a temperature of around 200° F. On the other hand, high temperature region F of absorber 14 might have a temperature of around 300° F. and low temperature region C of absorber 14 might have a temperature of around 100° F. In each of generator 12 and absorber 14 there is an area of overlapping temperature termed herein the heat transfer region. This heat transfer region is depicted in FIG. 1 as the area between regions D and I of generator 12 and the area between regions G and F of absorber 14.

An absorption generator for use with ammonia/water (or other fluid where the absorbent is volatile) is, in essence, a distillation column, which has a stripping section and a rectifying section. The stripping section is the lower, hotter section corresponding to the portion between regions D and E, while the rectifier section is the upper, cooler section corresponding to the portion above region D. The dividing point between the stripping and rectifying sections, region D, is the region of the generator that has a temperature corresponding to the boiling point of the rich liquor liquid at the generator pressure. As used herein, the term "generator" commonly refers to the stripping section, and the terms "high temperature region" and "low temperature region" when referring to the generator apply to regions E and D of the stripping section, respectively.

As depicted in FIG. 1, the vertical temperature gradients of absorber 14 and generator 12 are reversed, i.e., the highest temperature region E of generator 12 is at or near its lower, or bottom end, whereas the highest temperature region F of absorber 14 is at or near its upper end. Thus, the orientation of the respective heat transfer regions D–I and G–F is similarly opposite. The temperature range defining heat transfer regions D–I and G–F is within the temperature overlap between the temperature range of generator 12 and the temperature range of absorber 14, which may be within the range of, for example, about 200° F. to about 300° F. (at the conditions used for rating heat pumps in the United States).

The known apparatus depicted in FIG. 1 includes a heat transfer circuit 30 disposed between heat transfer regions D–I and G–F of generator 12 and absorber 14, which is oriented so as to conduct fluid directly between areas of the heat transfer regions.

During operation of the known system of FIG. 1, a low pressure refrigerant, consisting primarily of a refrigerant, such as ammonia, but possibly containing a small amount of absorbent, especially if the absorbent is volatile, as is water, exits evaporator 18 mostly as a vapor and passes through conduit 28 to absorber 14 at low temperature region C. This refrigerant vapor rising upward through absorber 14 is absorbed into a countercurrent flow of weak liquor, thus producing a rich liquor 32 that accumulates in the liquid state at low temperature region C of absorber 14. This process takes place at a temperature above that of the surroundings, generating heat, some of which is transferred to air, water, antifreeze or other heat transfer fluid circulating during this process through heat exchanger 36 located in a heat exchange circuit 34.

Rich liquor 32 is then transferred along rich liquor pathway 21 by a rich liquor pump 38 to region D of generator 12, where a higher pressure is maintained. A higher pressure is maintained in generator 12 than in absorber 14. For example, the pressure in generator 12 may commonly be around 240–400 psia and the pressure in absorber 14 may be around 15–80 psia, depending on the operating temperature. In accordance with the absorber heat exchange (AHE) cycle principle, heat exchanger 40 in rich liquor pathway 21 is used to transfer absorber heat to rich liquor 32. In one alternative, rich liquor 32 is heated in heat exchanger 40 essentially to its boiling point at the pressure of generator 12 and provided as a heat input to region D of generator 12. Alternatively, as shown in FIG. 1, rich liquor 32 is heated in heat exchanger 40 to a temperature below its boiling point and thereafter is heated in heat exchanger 41 in the rectifier section above region D of generator 12. In either alternative, rich liquor 32 is distributed within generator 12 at region D.

Heat source 42 and heat transfer fins 44 cooperate to heat rich liquor 32 as it passes downward through generator 12, thereby driving off refrigerant vapor from rich liquor 32 to form weak liquor 46 at high temperature region E of generator 12. Vapor having a concentration of near 100% refrigerant is expelled from generator 12 through refrigerant pathway 24 to condenser 16 where it is condensed and fed via conduit 26 through restriction means 48 to a lower pressure in evaporator 18. Weak liquor 46 in high temperature region E of generator 22 is returned through weak liquor pathway 22 through restriction means 23 to high temperature region F of absorber 14. The sensible heat of weak liquor 46 is provided as a heat input to generator 12 at heat exchanger 52. Heat may also be transferred in a heat exchanger (not shown) between rich liquor pathway 21 and weak liquor pathway 22.

In the known generator-absorber heat exchange system illustrated in FIG. 1, heat transfer is performed by a GAX heat transfer circuit 30, including, for example, a pair of heat exchange coils 50 and 53 and a pump 54 to circulate heat transfer fluid such as pressurized water. Since the vertical temperature gradients of absorber 14 and generator 12 are reversed, it is necessary to cross-connect the pathways between coils 50 and 53, as illustrated in FIG. 1.

Figure 2:
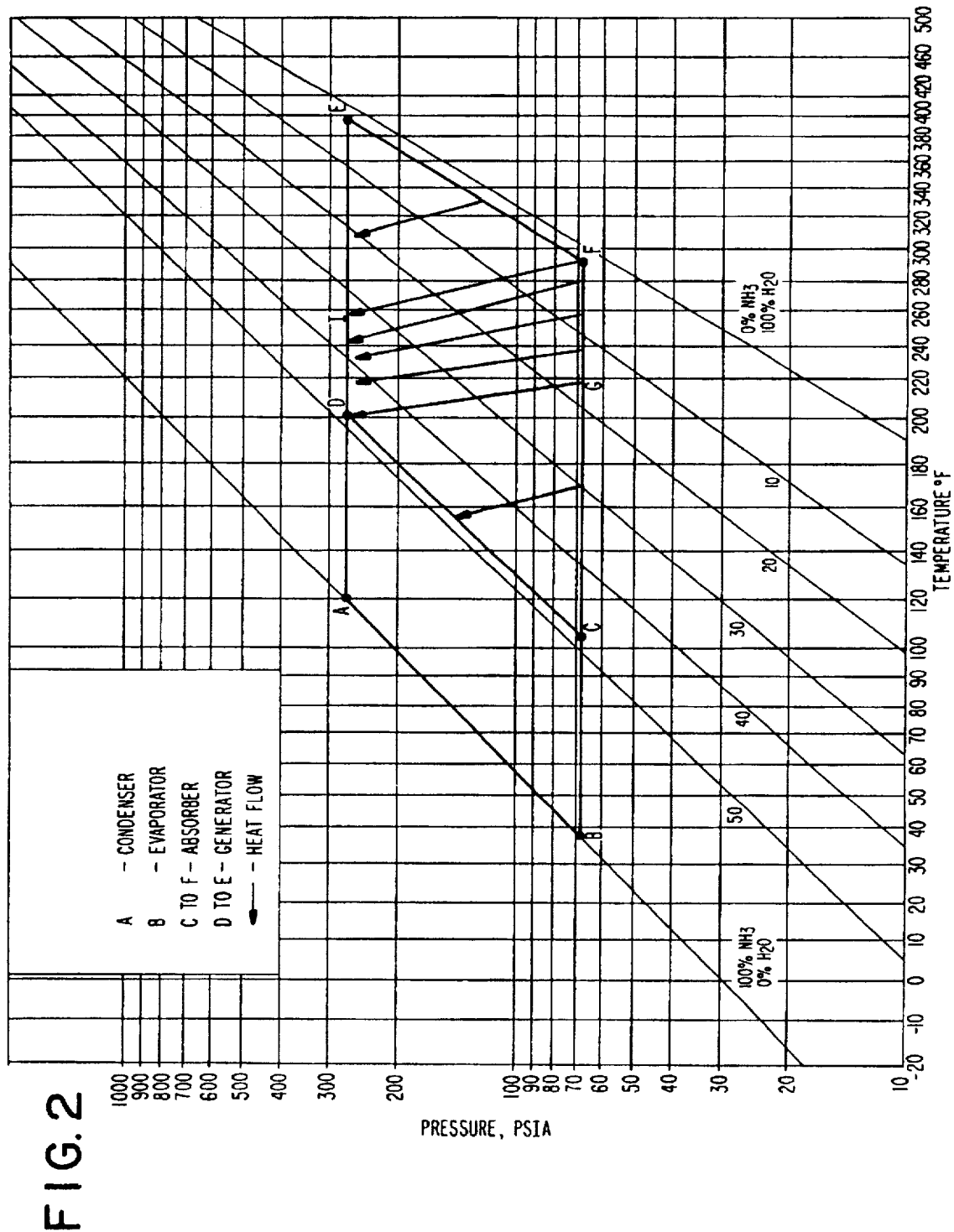
FIG. 2 is a pressure-temperature-composition (P-T-X) diagram of the system in FIG. 1.

The principle of the GAX cycle is illustrated in the pressure-temperature-composition diagram of FIG. 2 in which point D represents the dividing point between the stripping and rectifying sections of generator 12, point E represents the high temperature region of generator 12, point C represents the low temperature region of absorber 14, point F represents the high temperature region of absorber 14, point I represents the region of generator 12 that is at a temperature lower than the temperature of point F in absorber 14 by an amount sufficient to provide the necessary temperature difference for heat transfer between those regions, and point G represents the region of absorber 14 that is at a temperature higher than the temperature of point D in generator 12 by an amount sufficient to provide the necessary temperature difference for heat transfer between those regions. These regions in FIG. 2 correspond to regions D, E, C, F, I and G, respectively, in FIG. 1.

In FIG. 2, line D–I represents the heat transfer region of generator 12 and line G–F represents the heat transfer region of absorber 14. Points A and B represent the condenser 16 and evaporator 18, respectively. The line from C to D represents rich liquor pathway 21 and the line from E to F represents weak liquor pathway 22. The multiple arrows in FIG. 2 extending from the G–F line to the D–I line indicate heat transfer from the heat transfer region of absorber 14 to the heat transfer region of generator 12. The single arrows extending from the line EF to the line IE and from the line CG to the line CD indicate heat transfer from heat exchanger 52 to generator 12 and from absorber 14 to heat exchanger 40, respectively.

The heat to be transferred from absorber 14 to generator 12 is available over a temperature range in absorber 14 and should be transferred to a temperature range in generator 12 that is cooler only by the temperature differential required to transfer the heat. To do this most efficiently, the heat from the hottest segment of heat transfer region F of absorber 14 should be transferred to the hottest segment of heat transfer region I in generator 12, and similarly for each of the progressively cooler segments of heat transfer regions of absorber 14 and generator 12. This means that the heat transfer fluid temperature range must fit between the heat transfer region temperature ranges of generator 12 and absorber 14, and each of the segments.

In accordance with the present invention, as embodied and broadly described herein, a heat exchange circuit is provided in a generator-absorber heat exchange apparatus that includes a generator and an absorber. The absorber has an interior pressure lower than the pressure of the generator interior and each of the generator and absorber has high and low temperature regions with vertically opposed temperature gradients and a heat transfer region. The temperature ranges defining the respective heat transfer regions overlap. The generator-absorber heat exchange apparatus includes a fluid flow pathway for circulation of a liquor having rich, intermediate and weak concentrations of refrigerant to and through the high temperature, heat transfer and low temperature regions of the generator and absorber.

Like copending application Ser. No. 08/347,255, the present invention provides various embodiments and methods for performing GAX heat transfer in a generator-absorber heat exchange apparatus using the refrigerant/ absorbent working fluid of the system. However, unlike the copending application, which uses the intermediate liquor as the heat transfer medium, the present application uses rich liquor as the heat transfer medium. As mentioned earlier, as used herein, the term "rich liquor" refers to a liquor in the low temperature regions of the generator and absorber, i.e., the bottom portion of the absorber and the top portion of the generator.

The apparatus of the present invention includes a heat exchange circuit that receives a liquor from the generator at a location where the liquor has a rich liquor concentration and circulates the rich liquor between the heat transfer regions of the absorber and the generator to transfer heat from the absorber to the generator. The term "heat transfer region" as used herein is intended to include not only regions in the interior of the generator and absorber having overlapping temperatures, but also those regions adjacent to or in heat transfer contact with the interior of the generator and absorber having overlapping temperatures. The transfer should preferably be provided over the full overlap temperature range.

In accordance with the invention, as embodied and broadly described herein, the heat exchange circuit comprises a heat exchange element disposed in the heat transfer region of the absorber and a conduit conducting the rich liquor from the fluid flow pathway through the heat exchange element and between heat transfer regions. The heat exchange circuit of the invention may also include a heat exchange element disposed in the heat transfer region of the generator with a conduit conducting the rich liquor from the fluid flow pathway serially to each heat exchange element sequentially between heat transfer regions. The term "heat exchange element" as used in accordance with the invention refers to any apparatus or device that is capable of providing for the exchange of heat between fluids, such as a heat exchange coil.

In accordance with the invention, as embodied and broadly described herein, the motive force for circulating the liquor in the heat exchange circuit is preferably provided by a liquid head, but may also be provided in some instances by a pump. The heat exchange circuit also preferably includes an input end in fluid communication with the fluid flow pathway for withdrawing rich liquor from the generator and an output end for distributing the liquor within the generator.

Figure 3:
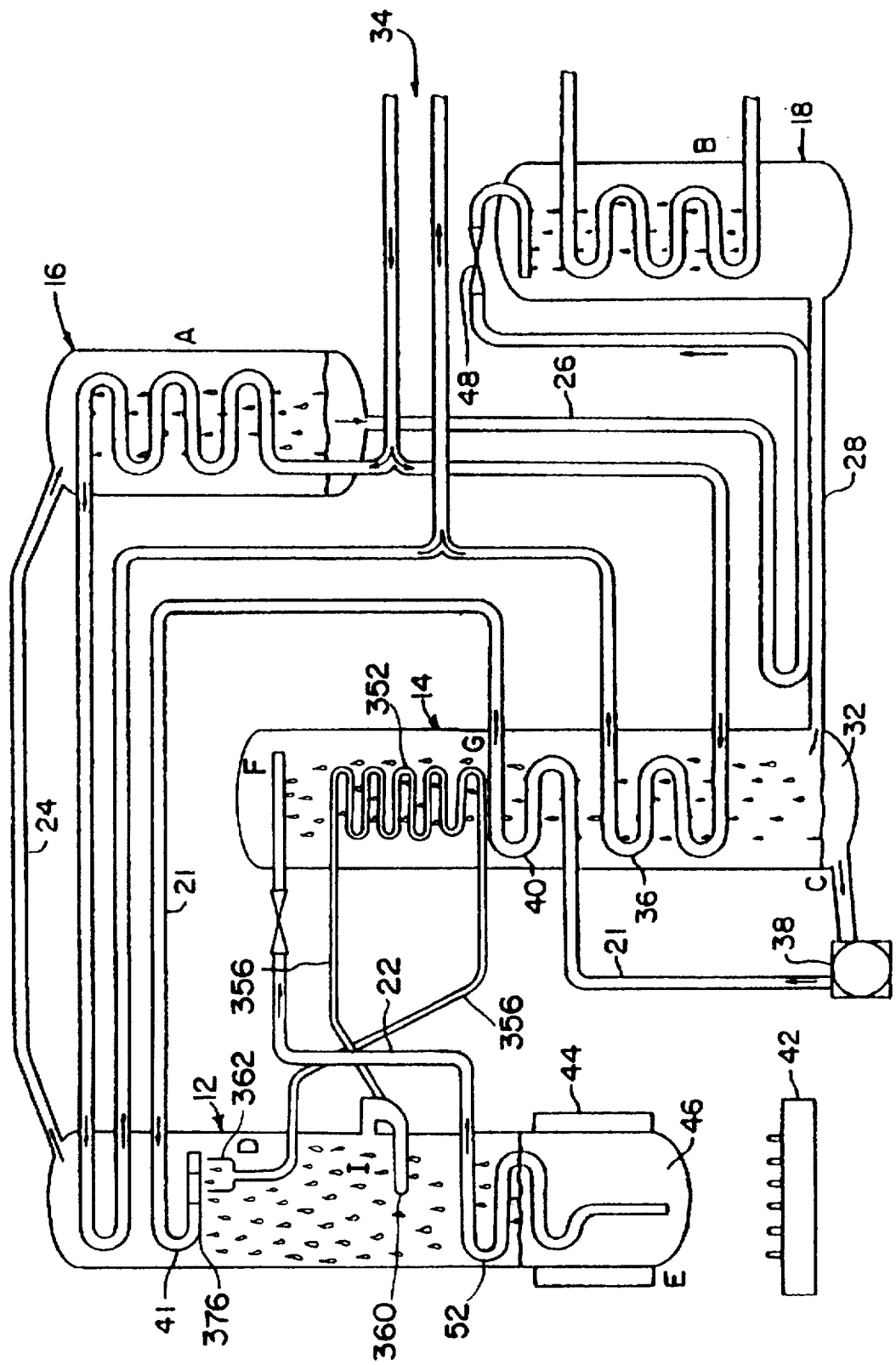
FIG. 3 is a flow diagram of a first embodiment of the GAX apparatus of the present invention.
Figure 4:
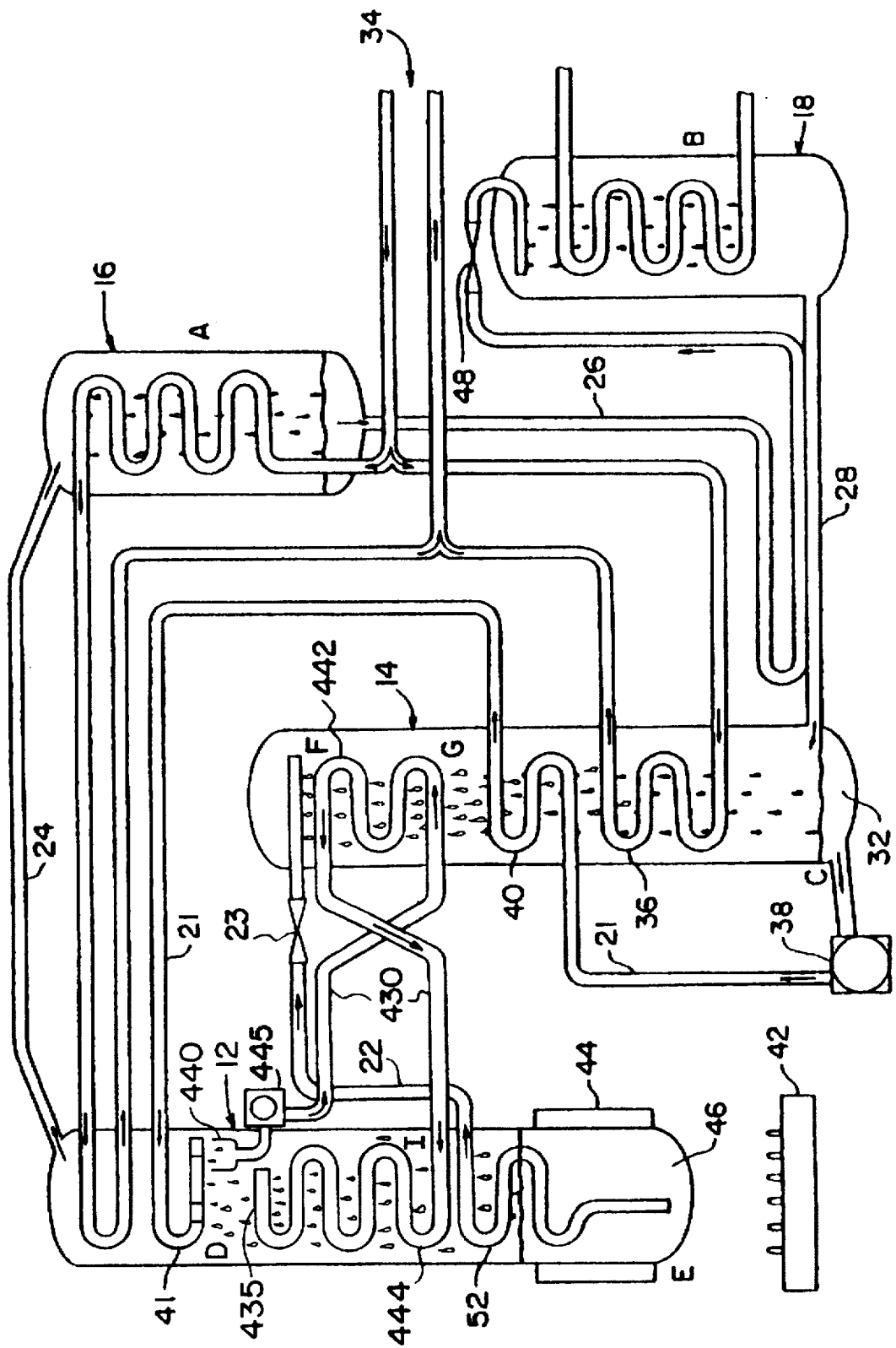
FIG. 4 is a flow diagram of a second embodiment of the GAX apparatus of the present invention.

The present invention, as illustrated in FIGS. 3 and 4, includes an input end in fluid communication with the generator at a location where the liquor has a rich liquor concentration, thus using the rich liquor as the heat transfer medium. This input end may consist of any suitable device for accumulating a liquid.

The present invention, as illustrated in FIGS. 3 and 4, also includes an output end for the heat exchange circuit to distribute the rich liquor circulated between heat transfer regions into the generator. This output end may be any device capable of distributing a liquid or a vapor/liquid mixture, such as a distributor in the case of a liquid, or a separator/distributor in the case of vapor/liquid mixtures.

The present invention, as illustrated by FIGS. 3 and 4, uses a working fluid as the heat transfer medium that is preferably a two phase liquid/vapor mixture in at least a portion of the heat exchange circuit and thus takes advantage of the latent heat of the working fluid.

One embodiment of the invention, shown in FIG. 3, uses a working fluid removed from generator 12 as the heat transfer fluid. This working fluid is a liquid/vapor two phase fluid in at least a portion of the heat exchange circuit, and thus exploits the latent heat of the working fluid. Referring specifically to FIG. 3, a generator-absorber heat exchange apparatus 300 is illustrated. In this embodiment, the heat exchange circuit comprises heat exchange coil 352 located in the heat transfer region of absorber 14. A heat exchange conduit 356 is provided which includes an input end disposed to withdraw rich liquor from a location at or above region D of generator 12 and an output end that can be, for example, a separator/distributor 360 preferably located proximate to region I of generator 12 for distributing the rich liquor. The input end in FIG. 3 is shown as liquid accumulator 362, and may be any means to collect rich liquor liquid in the interior of generator 12. Heat exchange conduit 356 conducts the rich liquor between heat transfer regions of generator 12 and absorber 14.

In accordance with this embodiment of the invention, the motive force for circulating rich liquor between generator 12 and absorber 14 may be gravity, in the form of the liquid head from the rich liquor collected by liquid accumulator 362. The rich liquor is circulated through heat exchange conduit 356 to heat exchange coil 352 where at least a portion of the rich liquor is vaporized by the heat of absorber 14. The two phase mixture of rich liquor is then circulated via heat exchange conduit 356 to separator/distributor 360 in generator 12. Separator/distributor 360 separates the two phase mixture and provides the liquid and vapor to generator 12, preferably at a location where the temperature and pressure in generator 12 is the same or similar to the temperature and pressure of rich liquor exiting separator/distributor 360. In this embodiment, separator/distributor 360 is preferably located proximate to region I of generator 12.

As mentioned, the rich liquor in this embodiment is a two phase mixture of vapor and liquid in at least a portion of heat exchange conduit 356. The rate of flow of rich liquor through heat exchange conduit 356 is controlled by the amount of liquid collected in liquid accumulator 362, the difference in height between liquid accumulator 362 and separator/distributor 360, the pressure drop through heat exchange conduit 356 and by the amount of vapor evaporated from the rich liquor liquid in heat exchange coil 352. The inlet section of heat exchange conduit 356 between liquid accumulator 362 and the bottom of heat exchange coil 352 is filled with rich liquor liquid. The liquor in heat exchange coil 352 is partly liquid and partly vapor, having a density well below that of the liquid in the inlet section of heat exchange conduit 356, thus increasing the head between the liquid accumulator 362 and separator/distributor 360. The extent to which the inlet liquid is vaporized in heat exchange coil 352 thus helps control the flow through heat exchange conduit 356. By properly adjusting the pressure drop in heat exchange conduit 356, the flow of rich liquor can be controlled by the amount of heat transfer in heat exchange coil 352. It is important that the rich liquor collected by liquid accumulator 362 be greater than the largest amount of rich liquor to be used for heat transfer. In other words, there should be a small overflow from liquid accumulator 362 to maintain an appropriate height between the liquid surface in liquid accumulator 362 and the outlet of separator/distributor 360.

Another embodiment of the invention, shown in FIG. 4, uses working fluid removed from generator 12 as the heat transfer fluid. This fluid is also a liquid/vapor two phase mixture in at least a portion of the heat exchange circuit, and thus takes advantage of the latent heat of the working fluid. Referring specifically to FIG. 4, a generator-absorber heat exchange apparatus 400 is illustrated. In this embodiment, the heat exchange circuit comprises heat exchange coil 442 located in the heat transfer region of absorber 14 and heat exchange coil 444 located in the heat transfer region of generator 12. A heat exchange conduit 430 is provided which includes an input end disposed to withdraw rich liquor from generator 12 and an output end that is preferably a distributor 435 for distributing the rich liquor. The input end in FIG. 4 is shown as liquid accumulator 440, which is preferably located proximate to region D of generator 12, and may be any means to collect rich liquor liquid in the interior of generator 12.

In accordance with this embodiment of the invention, the motive force for circulating rich liquor between generator 12 and absorber 14 may be the liquid head between liquid accumulator 440 and the inlet of heat exchange coil 442, as in the embodiment of FIG. 3. Alternatively, if necessary, the motive force may be provided by heat exchange circuit pump 445, shown in FIG. 4. The rich liquor is circulated through heat exchange conduit 430 to heat exchange coil 442 in the heat transfer region of absorber 14 where at least a portion of the rich liquor is vaporized by the heat of absorber 14. The two phase mixture of rich liquor is then circulated via heat exchange conduit 430 to heat exchange coil 444 in the heat transfer region of generator 12 where it is cooled and the vapor is reabsorbed, giving up its heat to the interior of generator 12. The rich liquor exits heat exchange coil 444 at distributor 435. Distributor 435 is preferably located where the temperature and pressure in generator 12 is the same or similar to the temperature and pressure of rich liquor exiting distributor 435. In this embodiment, distributor 435 is preferably located at the same level or just below accumulator 440 in generator 12.

As mentioned, the rich liquor in this embodiment is a two phase mixture of vapor and liquid in at least a portion of heat exchange conduit 430. The amount of flow of rich liquor between heat exchange coils 442 and 444 may be the total flow of rich liquor collected or may be controlled as described earlier herein, or by heat exchange circuit pump 445, to optimize the amount of heat transferred from absorber 14 to generator 12. As in the embodiment of FIG. 3, the liquid accumulator and distributor can be combined into a single accumulator/distributor, thereby allowing easy control of GAX heat transfer by controlling the flow rate of rich liquor through the heat exchange circuit.

In all of the embodiments of the invention described herein and variations thereof, it is preferable to orient the flow of heat transfer liquid, or liquid and vapor mixture, vertically upwards when passing such through a heat exchange coil in either the generator or absorber. This flow orientation generally best matches the temperature gradients in the absorber and generator and provides the best counterflow temperature differentials between the rising coil contents and falling liquids in the absorber or generator.

In accordance with the embodiments of the GAX heat transfer apparatus described herein, the heat exchange coils can be located in the interior of the generator and absorber. Alternatively, in accordance with the invention, the heat exchange coils can be located at the exterior of the generator and absorber adjacent to and/or in heat transfer contact through metal walls with the region in which heat transfer is desired. The term "heat transfer region" as used herein is meant to include the interior of the generator or absorber, as well as regions outside the generator or absorber adjacent to and/or in heat transfer contact with the region in which heat transfer is desired.

Figure 5:
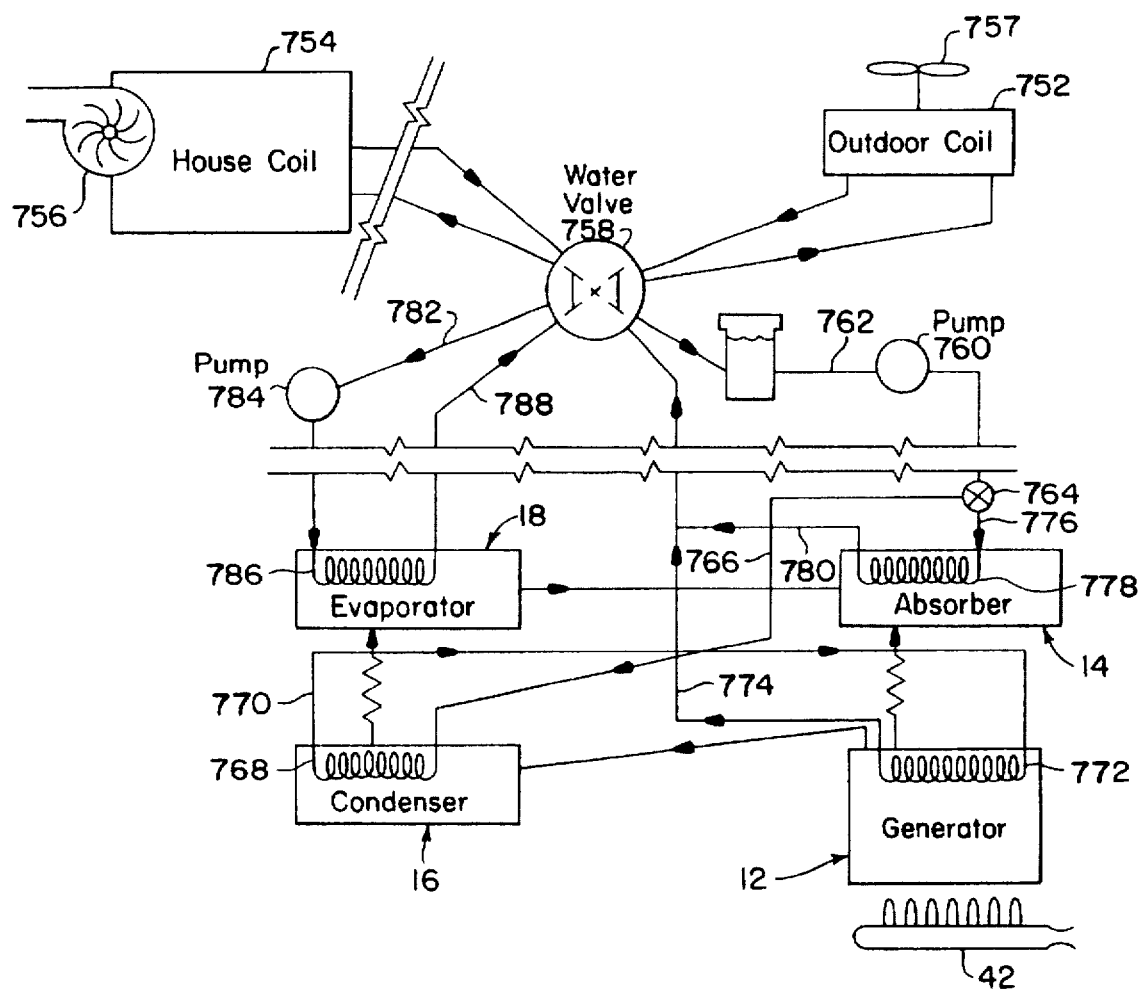
FIG. 5 is a flow diagram of the heat pump of the present invention using the GAX apparatus of the invention.

The various embodiments of the generator-absorber heat exchange apparatus of the invention can advantageously be used in a heat pump. Referring to FIG. 5, a heat pump 700 is provided which uses one of the generator-absorber heat exchange apparatuses of the invention. The heat pump 700 includes an outdoor heat exchange coil 752 and an indoor heat exchange coil 754. Indoor heat exchange coil 754 may optionally include an air transport apparatus 756, such as a fan or blower for supplying heated or cooled air into a building. Outdoor heat exchange coil 752 may also optionally include an air transport apparatus 757, such as a fan or blower. Outdoor and indoor heat exchange coils 752 and 754, and air transport apparatuses 756 and 757, can be any of the standard, known equipment used in heat pump or air conditioning systems.

Heat pump 700 is comprised of two major sections, the generator-absorber heat exchange apparatus (absorption unit) and the antifreeze fluid system. The generator absorber heat exchange apparatus in accordance with the invention can be made up of the components discussed earlier herein, including an absorber 14, generator 12, condenser 16 and evaporator 18. The antifreeze fluid system is divided into a cold fluid circuit and a hot fluid circuit. The antifreeze fluids that can be used in accordance with the invention include those fluids known to be useful in transferring heat. A preferred antifreeze fluid is a water solution including an antifreeze liquid that is nontoxic and nonflammable, such as, for example, propylene glycol.

Contrary to standard heat pump systems that reverse the refrigeration circuit to change from cooling to heating, heat pump 700 of the invention, rather than reversing the refrigeration circuit, uses a system flow control apparatus 758, which is preferably an eight-way valve, that is capable of reversing the antifreeze circuits. System flow control apparatus 758 makes it possible to direct the cold and the hot antifreeze fluids from the cold evaporator 18 or from the hot condenser 16, absorber 14 and rectifier of generator 12 either to the outdoor heat exchange coil 752 or to the indoor heat exchange coil 754.

The cold antifreeze circuit comprises evaporator 18, which chills the antifreeze fluid via evaporator heat exchange coil 786, extracting from the antifreeze fluid the heat removed from the house or building in the summer or from the outdoor air in winter.

The hot antifreeze circuit comprises absorber 14, condenser 16 and rectifier of generator 12, which raise the temperature of the extracted heat to well above 100° F. The sum of the heat outputs of absorber 14, condenser 16 and rectifier of generator 12 is equal to the sum of the two heat input quantities, one from the gas flame and the other being the low temperature heat input to evaporator 18. Absorber 14, rectifier of generator 12 and condenser 16 transfer the system output heat to the hot antifreeze fluid via absorber heat exchange coil 778, rectifier heat exchange coil 772 and condenser heat exchange coil 768. In the winter, the hot antifreeze fluid transfers much more heat to the house or building than that from the gas flame. In many areas, supplemental heat may not be required.

In one specific embodiment of the heat pump of the invention, illustrated in FIG. 5, the hot antifreeze circuit includes a first conduit 762 which transports the antifreeze fluid from system flow control apparatus 758 to a first flow control device 764, which can be, for instance, a flow splitter. A fluid transport apparatus 760, such as a pump, is used to circulate the antifreeze fluid through the hot antifreeze circuit. Fluid transport apparatus 760 can be located anywhere in the hot antifreeze circuit, but is preferably located in first conduit 762.

In accordance with this embodiment, a first portion of the antifreeze fluid from first conduit 762 is directed via first flow control device 764 to a second conduit 766, which transports the antifreeze fluid to condenser heat exchange coil 768. In condenser heat exchange coil 768, heat is transferred from condenser 16 to the antifreeze fluid. The antifreeze fluid is transported from condenser heat exchange coil 768 to rectifier heat exchange coil 772 via third conduit 770. In rectifier heat exchange coil 772, heat is transferred from generator 12 to the antifreeze fluid. The antifreeze fluid is transported from rectifier heat exchange coil 772 back to system flow control apparatus 758 via fourth conduit 774.

A second portion of the antifreeze fluid in this embodiment from first conduit 762 is directed via first flow control device 764 to a fifth conduit 776, which transports the antifreeze fluid to absorber heat exchange coil 778. In absorber heat exchange coil 778, heat is transferred from absorber 14 to the antifreeze fluid. The antifreeze fluid is transported from absorber heat exchange coil 778 via sixth conduit 780 into fourth conduit 774 and back to system flow control apparatus 758.

The particular flow arrangement for the hot antifreeze circuit illustrated by FIG. 5 is meant to be illustrative only and should not limit the invention. Other flow arrangements for the antifreeze fluid between absorber 14, condenser 16 and generator 12 are within the scope of the invention. For example, the flow of antifreeze fluid through absorber 14, condenser 16 and generator 12 may be in parallel, as shown, or in series. However, depending on the application, it may be preferred that the flow through condenser 16 and absorber 14 be in parallel, as shown in FIG. 5.

The cold antifreeze circuit includes a first conduit 782 which circulates antifreeze fluid from system flow control apparatus 758 to evaporator heat exchange coil 786. In evaporator heat exchange coil 786, heat is transferred from the antifreeze fluid to evaporator 18. The antifreeze fluid is transported from evaporator heat exchange coil 786 back to system flow control apparatus 758 via second conduit 788. A fluid transport apparatus 784, such as a pump, is used to circulate the antifreeze fluid through the cold antifreeze circuit. Fluid transport apparatus 784 can be located anywhere in the cold antifreeze circuit, but is preferably located in first conduit 782. The particular flow arrangement for the cold antifreeze circuit illustrated by FIG. 5 is meant to be illustrative only and should not limit the scope of the invention.

System flow control apparatus 758 directs the cold antifreeze to indoor heat exchange coil 754 in summer and to outdoor heat exchange coil 752 in winter, at the same time directing the hot antifreeze to outdoor heat exchange coil 752 in summer and to indoor heat exchange coil 754 in winter. This method of reversing the flows to meet the household or building needs for heating or cooling also can also be used during the winter to defrost outdoor heat exchange coil 752, when desired, by reversing the flow to direct hot antifreeze to outdoor heat exchange coil 752.

The choice of materials of construction for all the embodiments described herein and variations thereof depends upon the components of the working fluid, i.e., the refrigerant and absorbent, and the expected operating pressure and temperature ranges. For an ammonia and water absorption solution operating up to about 300° F. (thus excluding the lower region of the generator) and pressures up to about 300 psia, mild steel is the preferred choice of material for all components contacting the solution. Aluminum, however, may be used for the evaporator and condenser, which come into contact with ammonia. The choice of materials of construction for other solutions should be known to those skilled in the art of absorption systems.

While the various GAX heat transfer means described herein have been illustrated in a residential or light commercial heat pump, their benefits are not limited to such applications. The enhanced performance provided by the various GAX heat transfer schemes set forth herein may be applied to processes requiring medium temperature heating and cooling such as brewing, food processing, pasteurizing and paper making, to mention but a few examples. Furthermore, the principles of the invention are not limited to absorption heat pump cycles that efficiently convert heat from a combination of low and high temperature heat sources to heat at a medium temperature. The invention is equally applicable to heat transformers which convert heat from a medium-high temperature, such as hot waste water discharged from a processing plant, to produce a useful high temperature output plus a lower temperature output.

It will be apparent to those skilled in the art that various modifications and variations can be made in the generator-absorber heat exchange apparatus, heat pump and method of transferring heat between the generator and absorber without departing from the spirit or scope of the invention. Thus, it is intended that the present invention cover the modifications and variations of this invention provided that they come within the scope of the appended claims and their equivalents.

What is claimed is:

1. A generator-absorber heat exchange apparatus comprising:
   a generator and an absorber, the absorber having an interior pressure lower than the pressure of the generator interior and each having high and low temperature regions at opposite ends establishing respective temperature ranges, the temperature ranges defining respective overlapping heat transfer regions;
   a fluid flow pathway circulating a liquor having rich, intermediate and weak concentrations of refrigerant to and through the high temperature, heat transfer and low temperature regions of the generator and the absorber; and
   a heat exchange circuit receiving a liquor from the generator at a location where the liquor has a rich liquor concentration and circulating said rich liquor between said heat transfer regions thereby transferring heat from the absorber to the generator.

2. The apparatus of claim 1 wherein the heat exchange circuit comprises a heat exchange element in the heat transfer region of the absorber, and a conduit conducting said rich liquor from the generator through said heat exchange element and between heat transfer regions.

3. The apparatus of claim 1 wherein the heat exchange circuit comprises a heat exchange element disposed in the heat transfer region of each of the generator and absorber, and a conduit conducting said rich liquor from the generator serially to each heat exchange element sequentially between heat transfer regions.

4. The apparatus of claim 1 wherein the heat exchange circuit further comprises a heat exchange circuit pump for circulating said rich liquor.

5. The apparatus of claim 1 wherein gravity provides the motive force for circulating said rich liquor.

6. The apparatus of claim 1 wherein the heat exchange circuit further comprises an input end in fluid communication with the generator at a location where the liquor has a rich liquor concentration.

7. The apparatus of claim 5 wherein the heat exchange circuit further comprises an output end for distributing said rich liquor within the generator.

8. The apparatus of claim 1 wherein the rich liquor circulated between heat transfer regions of the generator and absorber is a two phase mixture of liquid and vapor in at least a portion of the heat exchange circuit.

9. A generator-absorber heat exchange apparatus comprising:
- a generator containing a liquor having a concentration gradient that is rich proximate an upper end, weak proximate a lower end and intermediate therebetween, and a temperature gradient extending from low proximate the upper end to high proximate the lower end with a heat transfer region therebetween;
- an absorber having a pressure in its interior lower than the interior pressure of the generator and containing a liquor having a concentration gradient that is weak proximate an upper end, rich proximate a lower end and intermediate therebetween, and a temperature gradient extending from high proximate the upper end to low proximate the lower end with a heat transfer region therebetween;
- a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator;
- a pump in fluid communication with the rich liquor conduit moving fluid through the conduit between the absorber and the generator;
- a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;
- a heater disposed to heat liquor in the generator proximate the lower end thereof; and
- a heat exchange circuit comprising:
  - a heat exchange element in the heat transfer region of the absorber, said heat transfer regions of the generator and absorber having overlapping temperatures;
  - a heat exchange conduit having an input end receiving liquor from the generator at a location where the liquor has a rich liquor concentration and conveying the rich liquor between the heat transfer regions of the absorber and the generator for heat transfer therein.

10. The apparatus of claim 9, wherein the heat exchange circuit further comprises an output end for distributing the rich liquor within the generator.

11. The apparatus of claim 9 wherein the heat exchange circuit comprises a heat exchange element disposed in the heat transfer region of each of the generator and absorber.

12. The apparatus of claim 11, wherein the heat exchange circuit further comprises an output end for distributing the rich liquor within the generator.

13. The apparatus of claim 9 wherein the input end is a liquid accumulator.

14. The apparatus of claim 10 wherein the output end is a distributor.

15. The apparatus of claim 10 wherein the input end and the output end is a combined accumulator/distributor.

16. The apparatus of claim 9 wherein the heat exchange circuit further comprises a heat exchange circuit pump for circulating said rich liquor.

17. The apparatus of claim 9 wherein gravity provides the motive force for circulating said rich liquor.

18. The apparatus of claim 9 wherein the rich liquor circulated between heat transfer regions of the generator and absorber is a two phase mixture of liquid and vapor in at least a portion of the heat exchange circuit.

19. The apparatus of claim 10 wherein said heat exchange circuit comprises:
- a heat exchange element disposed in the heat transfer region of the absorber;
- a heat exchange conduit with said input end receiving rich liquor from the generator and said output end distributing said rich liquor to the generator, said heat exchange conduit conducting said rich liquor between the generator and absorber heat transfer regions.

20. The apparatus of claim 19 wherein the motive force for circulating said rich liquor is gravity.

21. The apparatus of claim 19 wherein the heat exchange circuit further comprises a heat exchange circuit pump for circulating said rich liquor.

22. The apparatus of claim 19 wherein the rich liquor circulated between heat transfer regions of the generator and absorber is a two phase mixture of liquid and vapor in at least a portion of the heat exchange circuit.

23. The apparatus of claim 19 wherein said input and output ends are located in different regions of the generator.

24. The apparatus of claim 23 wherein said input end is a liquid accumulator and said output end is a distributor.

25. The apparatus of claim 12 wherein said heat exchange circuit comprises:
- a heat exchange element disposed in the heat transfer region of the generator and a heat exchange element disposed in the heat transfer region of the absorber;
- a heat exchange conduit with said input end receiving rich liquor from the generator and said output end distributing said rich liquor to the generator, said heat exchange conduit serially interconnecting said heat exchange elements to conduct said rich liquor between the generator and absorber heat transfer regions.

26. The apparatus of claim 25 wherein the motive force for circulating said rich liquor is gravity.

27. The apparatus of claim 25 wherein the heat exchange circuit further comprises a heat exchange circuit pump for circulating said rich liquor.

28. The apparatus of claim 25 wherein the rich liquor circulated between heat transfer regions of the generator and absorber is a two phase mixture of liquid and vapor in at least a portion of the heat exchange circuit.

29. The apparatus of claim 25 wherein said input and output ends are located in substantially the same region of the generator.

30. The apparatus of claim 29 wherein said input end is a liquid accumulator and said output end is a distributor.

31. The apparatus of claim 29 wherein said input and output ends are a combined accumulator/distributor.

32. A heat pump comprising:
- an indoor liquid to air heat exchanger;
- an outdoor liquid to air heat exchanger;
- a generator-absorber heat exchange apparatus comprising:
  - a generator and an absorber, the absorber having an interior pressure lower than the interior pressure of the generator and each having high and low temperature regions at opposite ends and a heat transfer region, the temperature ranges defining the respective heat transfer regions overlapping;

a fluid flow pathway for circulation of a weak liquor from the high temperature region of the generator and a rich liquor from the low temperature region of the absorber to and through the high temperature and low temperature regions of the generator and the absorber;

a heat exchange circuit receiving a liquor from the generator at a location where the liquor has a rich concentration and circulating the rich liquor between the heat transfer regions of the generator and the absorber for heat transfer therein; and an antifreeze circuit circulating antifreeze fluid between each of the indoor and outdoor heat exchangers and the generator-absorber heat exchange apparatus for selectively extracting heat from one of said heat exchangers and transferring heat to the other of said heat exchangers.

33. The heat pump of claim 32, wherein the heat exchange circuit further comprises an output end for distributing the rich liquor within the generator.

34. The heat pump of claim 33 wherein said heat exchange circuit comprises:

a heat exchange element disposed in the heat transfer region of the absorber;

a heat exchange conduit with said input end receiving rich liquor from the generator and said output end distributing said rich liquor to the generator, said heat exchange conduit conducting said rich liquor between the generator and absorber heat transfer regions.

35. The heat pump of claim 33 wherein said heat exchange circuit comprises:

a heat exchange element disposed in the heat transfer region of the generator and a heat exchange element disposed in the heat transfer region of the absorber;

a heat exchange conduit with said input end receiving rich liquor from the generator and said output end distributing said rich liquor to the generator, said heat exchange conduit serially interconnecting said heat exchange elements to conduct said rich liquor between the generator and absorber heat transfer regions.

36. A method for transferring heat between an absorber and a generator in a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, and a fluid flow pathway circulating a liquor having rich, intermediate and weak concentrations of refrigerant to and through the high temperature, heat transfer and low temperature regions of the generator and the absorber, said method comprising:

circulating a liquor having a rich concentration from the generator between the heat transfer region of the absorber and the heat transfer region of the generator thereby transferring heat from the absorber to the generator.

37. The method for transferring heat between an absorber and a generator in accordance with claim 36, wherein said method comprises:

circulating rich liquor from an input end disposed to receive rich liquor from the generator, through the heat transfer region of the absorber to an output end in the generator, such that the temperature of the rich liquor from the heat transfer region of said absorber is greater than the temperature of the region of the generator to which the rich liquor is circulated, thereby transferring heat to the generator from said rich liquor.

38. The method of claim 37 wherein said method comprises:

circulating the rich liquor between said heat transfer regions via a heat exchange element disposed in the heat transfer region of the absorber, thereby transferring heat via the rich liquor from the heat transfer region of the absorber to the heat transfer region of the generator.

39. The method of claim 38 wherein the motive force for circulating said rich liquor is gravity.

40. The method of claim 38 wherein the rich liquor circulated between heat transfer regions of the generator and absorber is a two phase mixture of liquid and vapor in at least a portion of the heat exchange circuit.

41. The method of claim 38 wherein said input and output ends are located in different regions of the generator.

42. The method for transferring heat between an absorber and a generator in accordance with claim 36, wherein said method comprises:

circulating rich liquor from an input end disposed to receive rich liquor from the generator, through the heat transfer region of the absorber and the heat transfer region of the generator, to an output end in the generator, such that the temperature of the rich liquor from the heat transfer region of said absorber is greater than the temperature of the region of the generator to which the rich liquor is circulated, thereby transferring heat to the generator from said rich liquor.

43. The method of claim 42, wherein said method comprises:

circulating the rich liquor between said heat transfer regions via a heat exchange element disposed in the heat transfer region of the absorber and a heat exchange element disposed in the heat transfer region of the generator, thereby transferring heat via the rich liquor from the heat transfer region of the absorber to the heat transfer region of the generator.

44. The method of claim 43 wherein the motive force for circulating said rich liquor is gravity.

45. The method of claim 43 wherein the rich liquor is circulated by a heat exchange circuit pump.

46. The method of claim 43 wherein the rich liquor circulated between heat transfer regions of the generator and absorber is a two phase mixture of liquid and vapor in at least a portion of the heat exchange circuit.

47. The method of claim 43 wherein said input and output ends are located in substantially the same region of the generator.

48. A method of transferring heat between a region of medium temperature and a region of high temperature using a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, and a fluid flow pathway circulating a liquor having rich, intermediate and weak concentrations of refrigerant to and through the high temperature, heat transfer and low temperature regions of the generator and the absorber, said method comprising:

circulating an antifreeze fluid between an outdoor heat exchanger and at least one of an absorber heat exchanger, a condenser heat exchanger and a generator heat exchanger, thereby transferring heat via said antifreeze fluid from said at least one absorber, condenser and generator heat exchanger to said outdoor heat exchanger;

circulating an antifreeze fluid between an indoor heat exchanger and an evaporator heat exchanger, thereby transferring heat via said antifreeze fluid from said indoor heat exchanger to said evaporator heat exchanger; and wherein said generator-absorber heat exchange apparatus includes a heat exchange circuit disposed to receive a liquor from the generator at a location where the liquor has a rich liquor concentration and to circulate said rich liquor between said heat transfer regions to transfer heat from the absorber to the generator.

49. A method of transferring heat between a region of low temperature and a region of medium temperature using a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, and a fluid flow pathway circulating a liquor having rich, intermediate and weak concentrations of refrigerant to and through the high temperature, heat transfer and low temperature regions of the generator and the absorber, said method comprising:

circulating an antifreeze fluid between an indoor heat exchanger and at least one of an absorber heat exchanger, a condenser heat exchanger and a generator heat exchanger, thereby transferring heat via said antifreeze fluid from said at least one absorber, condenser and generator heat exchanger to said indoor heat exchanger;

circulating an antifreeze fluid between an outdoor heat exchanger and an evaporator heat exchanger, thereby transferring heat via said antifreeze fluid from said outdoor heat exchanger to said evaporator heat exchanger; and wherein said generator-absorber heat exchange apparatus includes a heat exchange circuit disposed to receive a liquor from the generator at a location where the liquor has a rich liquor concentration and to circulate said rich liquor between said heat transfer regions to transfer heat from the absorber to the generator.

* * * * *